US006669298B2

(12) United States Patent
Thorn et al.

(10) Patent No.: US 6,669,298 B2
(45) Date of Patent: Dec. 30, 2003

(54) SEAT ASSEMBLY INCLUDING RESILENT FRICTION MEMBER

(75) Inventors: Richard P. Thorn, Erie, PA (US); Samson Beyene, Erie, PA (US)

(73) Assignee: Lord Corporation, Cary, NC (US)

( * ) Notice: Subject to any disclaimer, the term of this patent is extended or adjusted under 35 U.S.C. 154(b) by 4 days.

(21) Appl. No.: 10/095,369

(22) Filed: Mar. 11, 2002

(65) Prior Publication Data

US 2002/0093234 A1 Jul. 18, 2002

Related U.S. Application Data

(62) Division of application No. 09/349,886, filed on Jul. 8, 1999, now Pat. No. 6,386,528.

(51) Int. Cl.⁷ .................................................. A47C 7/60
(52) U.S. Cl. .................. 297/374; 297/300.8; 297/300.1; 297/302.1
(58) Field of Search .......................... 297/300.8, 303.3, 297/303.4, 374, 300.3, 303.2, 300.1, 302.1

(56) References Cited

U.S. PATENT DOCUMENTS

| | | |
|---|---|---|
| 3,232,597 A | 2/1966 | Gaydecki |
| 3,583,530 A | 6/1971 | De Venne |
| 3,696,891 A | 10/1972 | Poe |
| 3,796,288 A | 3/1974 | Hollnagel |
| 3,820,634 A | 6/1974 | Poe |
| 3,885,764 A | 5/1975 | Pabreza |
| 4,729,458 A | 3/1988 | Bauer et al. |
| 4,743,065 A * | 5/1988 | Meiller et al. ............ 297/300.3 |
| 4,765,444 A | 8/1988 | Bauer et al. |
| 4,818,020 A * | 4/1989 | Meiller et al. ....... 297/300.3 X |
| 4,957,279 A | 9/1990 | Thorn |
| 4,964,516 A | 10/1990 | Thorn |
| 5,004,214 A | 4/1991 | Marchina |
| 5,069,496 A | 12/1991 | Kunh et al. |
| 5,174,551 A | 12/1992 | Mintgen |
| 5,183,137 A | 2/1993 | Siwek et al. ................. 188/381 |
| 5,257,680 A | 11/1993 | Corcoran et al. ........... 188/129 |
| 5,295,564 A | 3/1994 | Stadelmann ................. 188/381 |
| 5,356,200 A | 10/1994 | Stumpf et al. .............. 297/328 |
| 5,447,357 A * | 9/1995 | Dauphin .................. 297/301.4 |
| 5,486,056 A | 1/1996 | Thorn ........................ 403/322 |
| 5,535,861 A | 7/1996 | Young ........................ 188/281 |
| 5,549,182 A | 8/1996 | Ehrnsberger et al. ........ 188/129 |
| 5,601,338 A | 2/1997 | Wahls ........................ 297/313 |
| 5,613,580 A | 3/1997 | Young ........................ 188/300 |
| 5,634,537 A | 6/1997 | Thorn ........................ 188/300 |
| 5,697,477 A | 12/1997 | Hiramoto et al. ...... 188/322.18 |
| 5,720,369 A | 2/1998 | Thorn ........................ 188/300 |
| 6,247,687 B1 | 6/2001 | Jensen et al. |

FOREIGN PATENT DOCUMENTS

| | | |
|---|---|---|
| FR | 70.249/1.110.107 | 3/1959 |
| FR | 1.257.027 | 2/1961 |
| FR | 1.375.269 | 9/1964 |

* cited by examiner

*Primary Examiner*—Anthony D. Barfield
(74) *Attorney, Agent, or Firm*—Edward F. Murphy, III

(57) ABSTRACT

A damper (20) for damping motion between two relatively moveable members, such as pivotal motion between components in office chairs (10). The damper (20) includes a outer member (22) having an internal recess (23) with a inner surface (24) and a crosswise oriented hole (30) intersecting the recess (23), and an inner member assembly (32) moveable relative to the outer member (22) having a shaft (34) with a resilient friction member (38) mounted thereon. The resilient friction member (38) frictionally engages the inner surface (24) in an interference fit relationship thereby radially precompressing the resilient friction member (38). The resilient friction member (38) preferably has one or more protrusions (40) that may be axially or radially oriented.

4 Claims, 6 Drawing Sheets

SEAT ASSEMBLY INCLUDING RESILIENT FRICTION MEMBER

This is a Divisional Application of U.S. patent application Ser. No. 09/349,886, filed Jul. 8, 1999 now U.S. Pat. No. 6,386,528.

FIELD OF THE INVENTION

The invention relates to the area of damping devices. Specifically, it relates to devices employing a resilient element operable in frictional contact with another member for generating damping forces.

BACKGROUND OF THE INVENTION

Various devices are known which utilize resilient elastomer elements to produce a damping force to control or minimize shock and/or vibration or to generate a locking function. In such prior art devices, the resilient elastomer element is in frictional engagement with another member.

Such devices are, for example, disclosed in U.S. Pat. No. 5,720,369 to Thorn entitled "Adjustable, Lockable Devices," U.S. Pat. No. 5,634,537 to Thorn entitled "Locking and Positioning Device," U.S. Pat. No. 5,613,580 to Young entitled "Adjustable, Lockable Strut", U.S. Pat. No. 5,257,680 to Corcoran et al. entitled "Surface Effect Dampers Having Both A Hysteresis and A Frictional Component, U.S. Pat. No. 5,183,137 to Siwek et al. "Dual Rate Surface Effect Dampers" U.S. Pat. No. 4,964,516 to Thorn entitled "Damped Extended-Motion Strut," U.S. Pat. No. 4,957,279 to Thorn entitled "Fluidless Multi-Directional Motion-Damping Mount," U.S. application Ser. No. 09/040,694 to Thorn et al. entitled "Resistance Generating Device," and U.S. application Ser. No. 09/040,694 to Miller et al. entitled "Elastomer Damper," all of which are commonly assigned to the assignee of the present invention.

Although these devices are adequate for their intended purposes, they each exhibit certain inadequacies that make them unattractive candidates for providing damping forces between relatively moveable members in low-cost applications. Moreover, many of the devices available heretofore include large numbers of components and provide damping forces that may vary significantly with tolerance variations.

Therefore, there is a long felt, and unmet, need for a simple, durable, maintenance free, and cost-effective damper for providing damping forces between relatively moveable members, and in particular, a damper configuration which is insensitive to tolerance variations due to manufacturing processes used to produce it.

SUMMARY OF THE INVENTION

The present invention provides a friction damper of simple construction including a resilient friction element in frictional engagement with a surface of another member. Moreover, the invention provides a damper exhibits excellent tolerance insensitive damping. The damper includes a tubular outer member and an inner member assembly reciprocatable therein. The tubular outer member includes a recess having an inner surface of preferably substantially constant diameter, and a first attachment hole radially intersecting the recess. The inner member assembly includes a shaft having a cross-wise directed second attachment hole and a resilient friction member preferably fixedly mounted (e.g., by bonding or mechanical fastening means) to the shaft. The resilient friction member is disposed in the recess in precompressed frictional contact with the inner surface of the outer member.

The tubular outer member is preferably open at its first and second ends and the constant diameter is preferably provided along its entire axial length. The shaft preferably includes a first dimension portion with a smaller dimension portion extending from it. The first dimension portion is preferably integral with the smaller dimension portion. Alternatively, the second portion may be a separate member which engages the first.

Various means may be employed for fixedly mounting the resilient friction member to the shaft. Most preferably, the friction member is bonded to the shaft. Alternatively, the smaller dimension portion may include a deformable portion that is deformed during assembly to secure the resilient friction member onto the shaft. According to another embodiment, the smaller dimension portion may include a taper on an end thereof and the shaft may include first and second steps thereon. During assembly the resilient friction member is received over the taper and snaps onto place between the steps. In another embodiment, a tinnerman-type lock washer is received over the end of shaft to fixedly secure the resilient friction member thereon.

As previously mentioned, in several other embodiments, a smaller dimension portion includes a separate member that engages a hole in the first dimension portion (e.g., a rivet or fastener). For example, the separate member may include a thread formed on the smaller dimension portion that engages a like thread formed on the hole. Moreover, the separate member may include one or more projections that snap into the first portion to retain the friction member in place.

According to a preferred embodiment, the resilient friction member preferably comprises at least one protrusion (most preferably a plurality of ribs) formed on an outer surface thereof. The ribs may be axially or radially oriented. These ribs are precompressed against the surface and allow significant variations in the tolerances of the members yet still providing adequate damping forces. Preferably, the resilient friction member is lubricated to provide more consistent damping and to minimize break away forces. If adjustment to the damping level is desired, one or more o-rings may be received over the resilient friction member thereby increasing its surface area.

In accordance with another embodiment of the invention, a plurality of undulations may be formed on the shaft for fixedly securing the resilient friction member to it. The undulations may be corrugations or jagged ridges over which the resilient friction member is received.

The damper according to the invention finds excellent utility for damping the movement of spring biased seatbacks. Therefore, according to another aspect of the invention, a tiltable seat assembly is provided which comprises a first seat member, a second seat member movably mounted on the first seat member, a spring biasing the second seat member relative to the first seat member and a damper including a resilient friction member linearly reciprocatable in an outer member interconnecting between the first and second seat members.

In more detail, a preferred embodiment of the damper comprises a tubular outer member including first and second open ends, a recess having an inner surface of substantially constant diameter, and a first attachment hole intersecting the recess at the first end thereof; and an inner member assembly received in the second end having a shaft with a first portion including a second attachment hole formed therein and a smaller dimension portion extending therefrom, and a resilient friction member fixedly mounted to the smaller dimension portion, the resilient friction member disposed in the recess in frictional contact with the inner surface.

According to another aspect, the invention comprises a tiltable seat assembly having a first seat member, a second seat member movably mounted on the first seat member, a spring biasing the second seat member relative to the first seat member, and a damper interconnected between the first and second seat members, the damper further comprising a first member having an engagement surface and attaching to one of the first and the second seat members, and a second member linearly reciprocatable relative to the first member and attaching to the other of the first and second seat members, the second member including a resilient friction member disposed in frictional contact with the engagement surface wherein the damper provides damping between the first and second seat members.

It is an advantage of the invention is that it provides a damper with simple, durable and low-cost construction.

Another advantage of the invention is that it provides adequate damping forces over relatively broad tolerance ranges.

Yet another advantage of the invention is that it provides cost-effective damping for controlling motion in spring-biased chairback applications.

The above-mentioned and further features, advantages and characteristics of the present invention will become apparent from the accompanying descriptions of the preferred embodiments and attached drawings.

BRIEF DESCRIPTION OF THE DRAWINGS

The accompanying drawings form a part of the specification and illustrate several embodiments of the present invention. The drawings and description, together, serve to fully explain the invention. In the drawings.

DETAILED DESCRIPTION OF THE PREFERRED EMBODIMENTS

Figure 1:
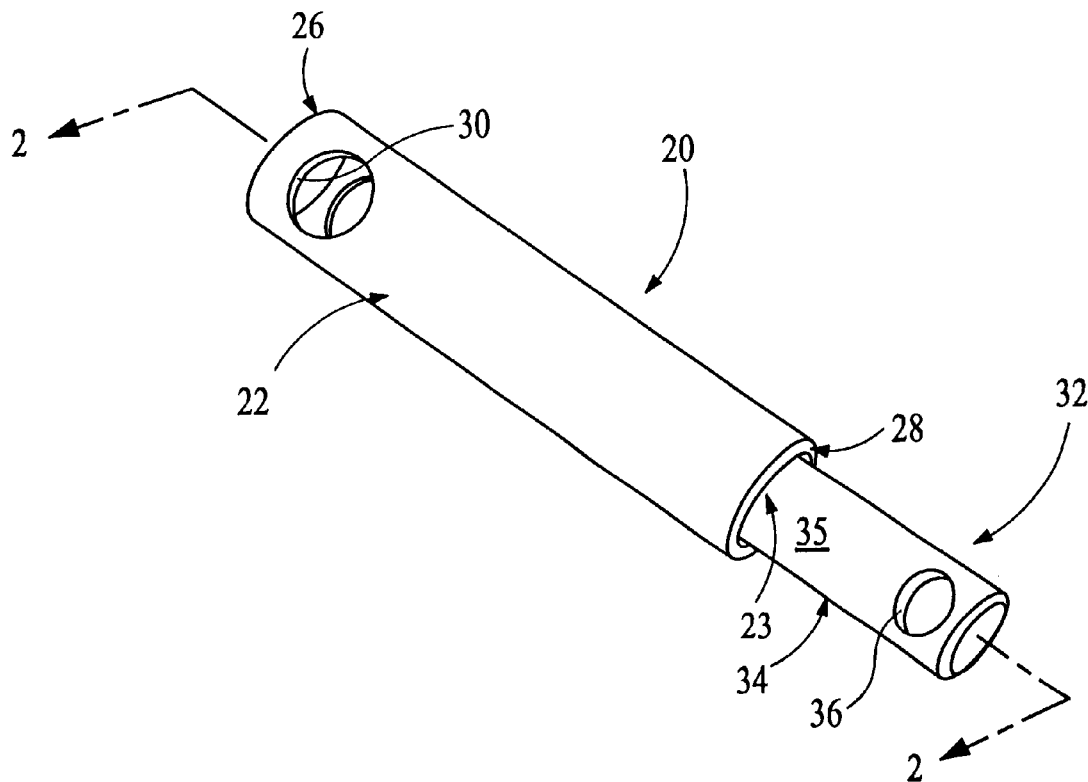
FIG. 1 is a perspective view of an embodiment of the damper in accordance with the present invention.

Referring now to the Drawings where like numerals denote like elements, FIGS. 1–13 illustrate various embodiments of the damper 20 and inner member assemblies 32 utilized therein. The damper 20 is useful for providing damping forces between any two relatively-movable structural members. According to the invention, the damper 20 includes an outer member 22 and an inner member assembly 32 linearly reciprocatable therein.

The outer member 22 preferably comprises a substantially-rigid, tube and includes a cylindrical recess 23 having an inner surface 24 of substantially constant diameter extending entirely along its length from a first open end 26 to a second open end 28 thereof. A first cross-wise oriented attachment hole 30 intersects the recess 23 at the first open end 26 of the outer member 22 and is used for pivotally attaching the damper 20 to a first structural member (see FIG. 14). Preferably, the outer member 22 is manufactured from steel, aluminum or plastic tube. The inner surface 24 preferably includes a smooth finish. Moreover, the surface 24 may be treated, for example with a Teflon coating to improve its friction and/or wear characteristics. In cases where the outer member 22 is not shown (FIGS. 3–6, 9–13), the various inner member assemblies 32 depicted are intended to be used with an outer member 22 identical to that shown in FIGS. 1–2.

The inner member assembly 32 includes a substantially rigid shaft 34 (e.g., plastic (Nylon), steel or aluminum, etc.) having a second cross-wise oriented attachment hole 36 formed therein, and a resilient friction member 38 fixedly mounted on the shaft 34. The term "fixedly mounted" means that the member 38 is mounted to the shaft and that it cannot move relative thereto by any appreciable amount, but may move slightly within bounds. The second hole 36 is used for pivotally attaching the other end of the damper 20 to a second structural member (see FIG. 14). The assembly 32 is received in the second open end 28 of the outer member 22 and is reciprocatable therein. Resilient friction member 38 is disposed in the recess 23 in frictional engagement with the inner surface 24 and is preferably radially precompressed such that there is always an interference fit between the outer member 22 and the resilient friction member 38.

Figure 2:
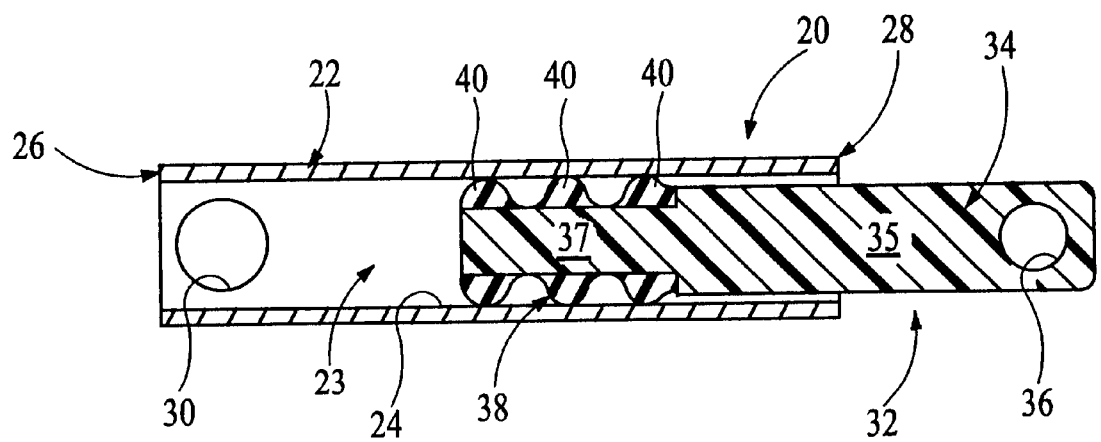
FIG. 2 is a cross sectional view of the damper taken along section line 2—2 of FIG. 1.
Figure 12:
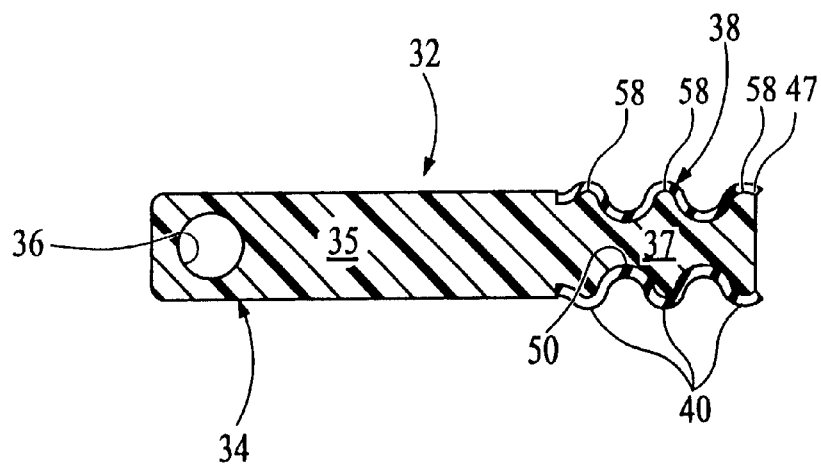
Figure 13:
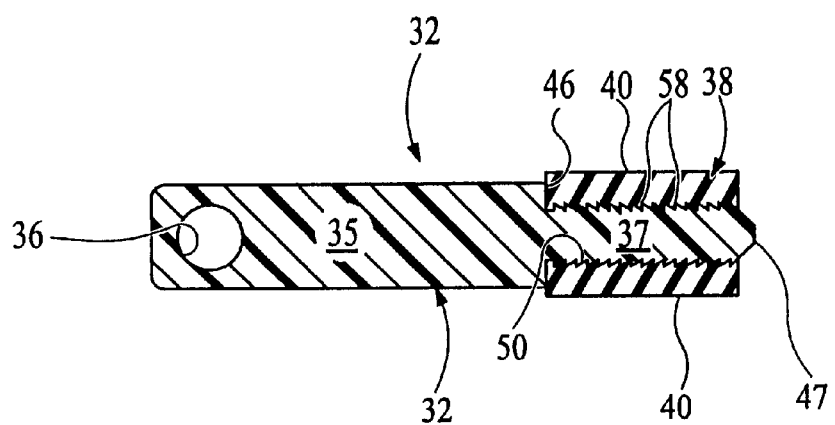

The shaft 34 preferably includes a first dimension portion 35 with a smaller dimension portion 37 extending axially from it. Except as shown in FIGS. 12 and 13, both portions 35, 37 are generally cylindrical. Most preferably, the first dimension portion 35 is formed integrally with the smaller dimension portion 37 and are manufactured from the same material. The resilient friction member 38 is preferably fixedly mounted to the smaller dimension portion 37 of the shaft 34 by a suitable bonding process, for example. The process may include a transfer, injection or compression bonding process, for example, where a suitable adhesive is applied to the smaller portion 37 of shaft 34 as shown in FIG. 2, and elastomer is molded thereto (within a mold) forming the appropriate shape and contours on the resilient member 38. Such processes are known to persons of ordinary skill in the art. Alternatively, the resilient friction member 38 may be molded separately in a molding process and subsequently cold bonded to the shaft 34 by coating the pertinent portions of the shaft 34 with a suitable cold bond adhesive, such as a cyanoacrylate adhesive or the like. In the case where the resilient friction member 38 is molded, it includes a through bore 50 formed therethrough.

Most preferably, as shown in FIGS. 2–6, and 8–13, the resilient friction member 38 includes at least one outwardly-extending protrusion 40 formed on a radial outer surface thereof. The at least one formed protrusion 40 is in direct frictional contact with the surface 24. Most preferably, the at least one protrusion 40 comprises a plurality of preferably equally-spaced outwardly projecting ribs formed on an outer surface of the resilient friction member 38. For example, as shown in FIGS. 2, 4–6, and 8, the ribs may include a radial orientation and form a corrugated profile where each such protrusion 40 is preferably rounded at it's point of contact with the surface 24. In each of the illustrated embodiments herein, the resilient friction member 38 may be lubricated with an appropriate lubrication, such as a grease. A grease which is found to be very effective is 3451 or 3452 available from Dow Corning or Damping Nygel available from NYE Lubricants. The valleys formed between the protrusions 40 serve the purpose of carrying and dispersing the lubricant. Suitable resilient materials for the resilient friction member 38 comprise Butyl, Silicone, Neoprene, or any other suitable elastomeric materials which are substantially incompressible and elastic. Most preferably, a natural rubber material exhibiting a Shore A durometer of about 50–60 is found to exhibit the combination of desirable characteristics for the damper 20. Alternatively, the rubber may be internally lubricated with appropriate additives, as is known to those of ordinary skill in the art.

Figure 3:
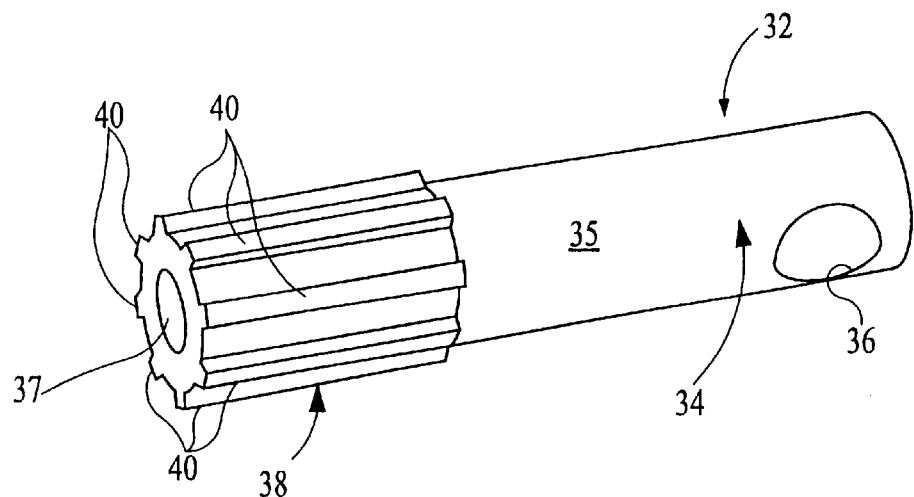
FIG. 3 is a perspective view of an alternate inner member assembly in accordance with the present invention.

According to another aspect of the invention, the at least one protrusion 40 on the friction member 38 is formed of a plurality of ribs as illustrated in FIGS. 3, 9–11, and 13 that may be axially oriented (generally parallel to the shaft axis). Preferably, the protrusions 40 comprise a rectangular, square or trapezoidal profile in radial cross section. The friction member 38, in these embodiments, may be bonded directly to the smaller portion 37 of shaft 34 as shown in FIG. 3, or mechanically locked to the shaft as in FIGS. 9–11 and 13. In both the radially and axially oriented cases, it is preferable that the ribs 40 of the resilient member 38 be precompressed radially in the range between about 5% and about 30%, and most preferably about 10%. This ensures that for normal manufacturing tolerance ranges, the ribs 40 will remains precompressed and adequate damping will be retained.

Figure 8:
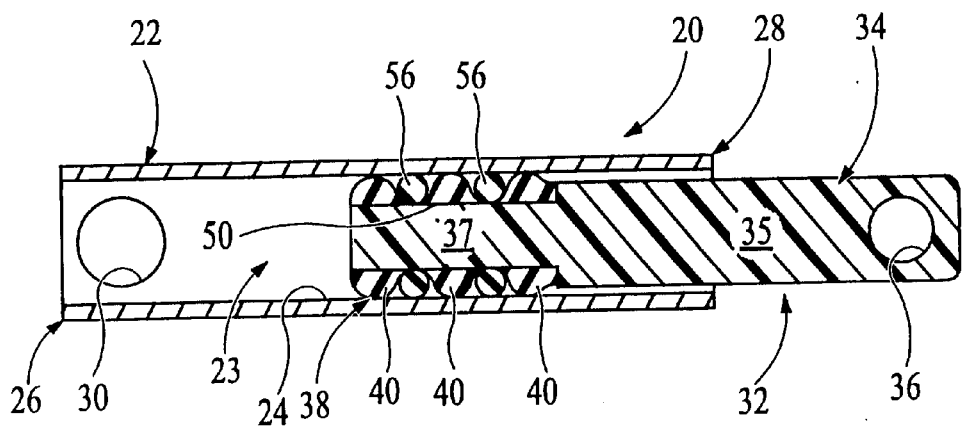
FIG. 8 is a cross sectional side view of another damper including o-rings for damping augmentation.
Figure 9:
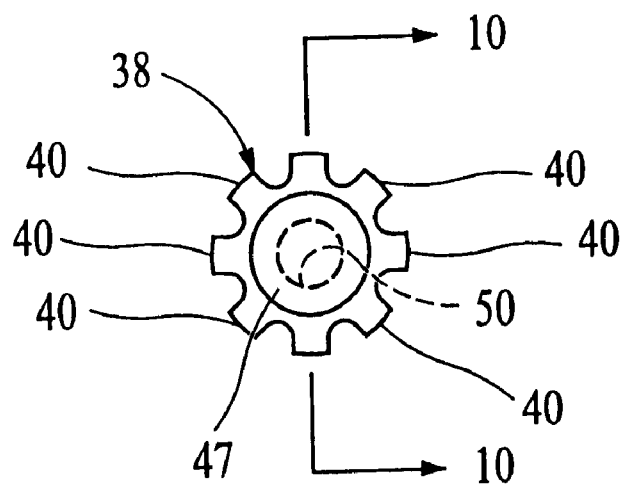
FIG. 9 is an end view of an inner member assembly in accordance with the present invention including a ribbed resilient friction member.
Figure 10:
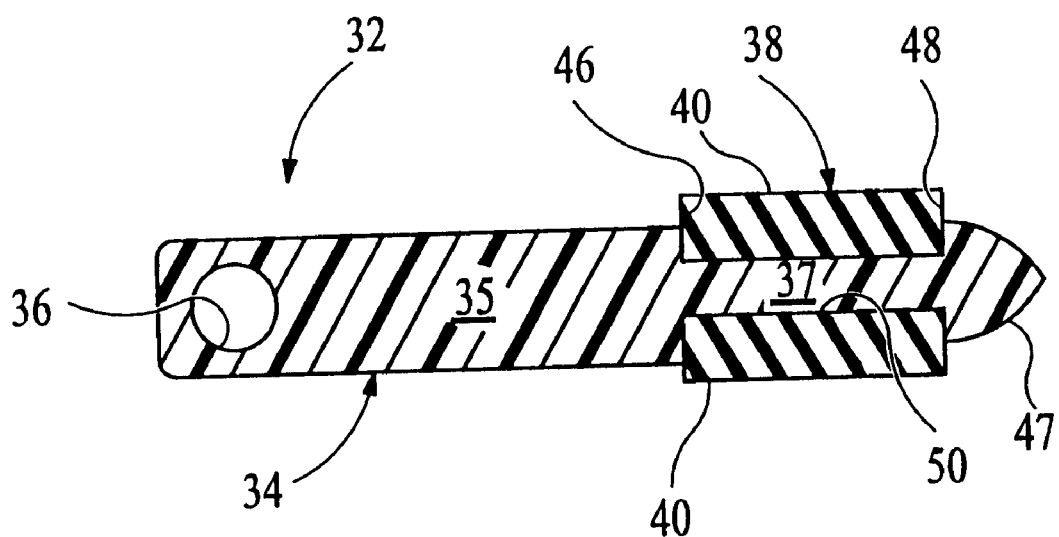
FIG. 10 is a cross sectional side view of the inner member assembly taken along line 10—10 of FIG. 9, FIGS. 11–13 are cross sectional side views of other inner member assemblies in accordance with the present invention.

In the FIGS. 9–10 embodiment for example, the shaft 34 comprises a taper 47 at its terminal end over which the resilient friction member 38 is received. The shaft 34 also includes a first dimension portion 35 and a smaller dimension portion 37 extending therefrom forming a first step 46 at an interface between the portions 35, 37. The taper 47 formed on the smaller dimension portion 37 terminates at a second step 48. During assembly, the resilient friction member 38 is received over the taper 47 and snaps onto place on the cylinder of portion 37 between the steps 46, 48. Suitable cold bond adhesive may be applied to the shaft 34 prior to assembly to add a secondary means for fixedly mounting the resilient friction member 38 to the shaft 34. The friction member 38, in this embodiment, includes a plurality of equally-spaced, radially-directed projections or ribs 40 which have a rectangular cross section. The shaft 34 of the assembly 32, as well as those shown in FIGS. 2, 4, 6, 8 and 11–13, is preferably formed from an injection molded plastic such as Nylon in an injection molding process as is known to those of ordinary skill in the art.

Figure 11:
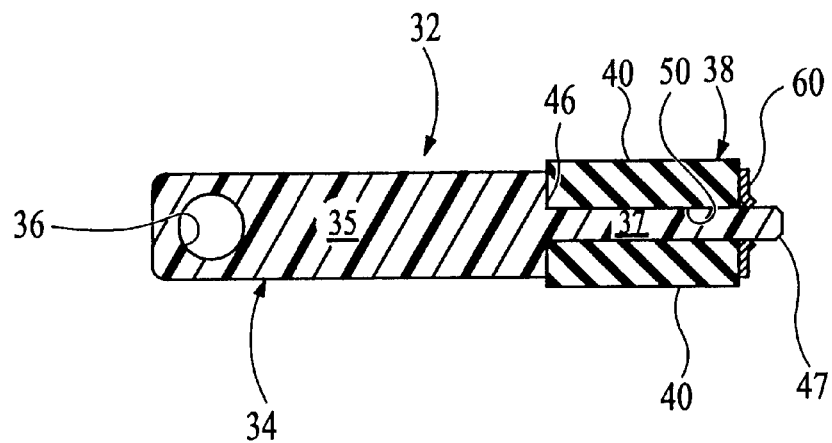

In the embodiment of FIG. 11, the mechanical retaining means used to fixedly secure the resilient friction member 38 to the shaft 34 comprises a tinnerman lock washer 60. The through bore 50 of resilient friction member 38 is pressed over smaller dimension portion 37 (which is slightly larger than it) and the lock washer 60 is received over the portion 37 and is pressed thereon until it snuggly engages the axial end of the friction member 38. The diameter of the washer 60 is preferably as wide as the diameter of the first portion 35 adjacent to the step 46. The tinnerman washer 60 is of the type that goes on relatively easily, but is extremely difficult to remove thereby permanently securing the friction member 38 in place against step 46. A taper 47 may be included on the end of portion 37 to aid in pressing on the friction member 38.

FIG. 13 illustrates another embodiment of inner member assembly 32 including a plurality of undulations 58 formed on the smaller portion 37 of shaft 34. In this embodiment, the undulations 58 comprise a series of jagged projections that engage the throughbore 50 of friction member 38. The outer diameters of the jagged portions 58 are slightly larger than the diameter of the through bore 50 in its undeformed state such that the friction member 38 is received over the shaft portion 37 in an interference fit relationship. Supplemental cold bond adhesive, as afore-described, may be employed if desired. The jagged portions 58 may include a gentle slope of their onward side and a steep (generally straight radially outward or even undercut) slope on their backside, such that the friction member 38 is easily pressed on, but once pressed on and positioned to abut the step 46, is very difficult to remove. As in the previously described embodiment, a taper 47 may be added to the end of shaft portion 37 to aid in pressing on the friction member 38. Other forms of jagged edges may be employed on the shaft 34. For example, the jagged ridges may only traverse part way around the circumference of the shaft 34 or be included only the part of the portion 37 near the end thereof.

FIG. 12 illustrates another embodiment of inner member assembly 32 wherein the projections 40 are created by a plurality of undulations 58 formed on the smaller portion 37 of shaft 34. Prior to assembly, the resilient friction member 38 comprises an annulus of elastomer. Upon pressed the bore 50 over the portion 37, the member 38 deforms to form the protrusions 40 and take on the shape shown in FIG. 12. This deformation fixedly secures the sleeve-shaped friction member 38 to the shaft 34. Preferably, the inner dimension of the sleeve 38 in its undeformed state is slightly smaller than the smallest diameter of the portion 37 thereby ensuring contact along the entire axial length of the shaft portion 37. A taper 47 may be included at the end of portion 37 to help facilitate stretching the sleeve 38 over it. Supplemental cold bond adhesive may be employed, if required for the application.

Figure 4:
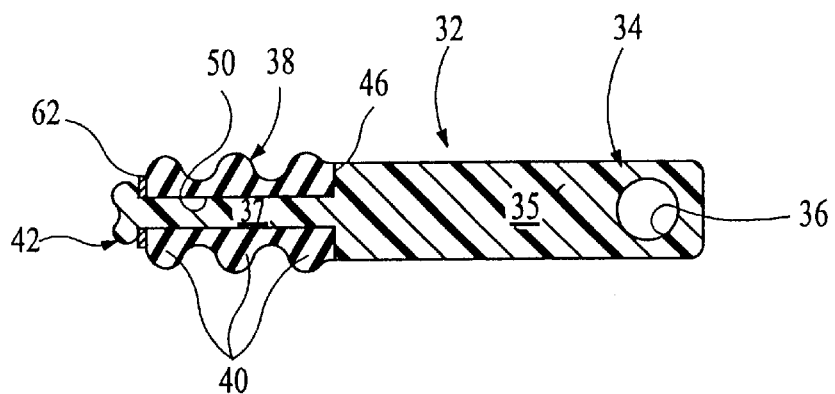
FIGS. 4–6 are cross sectional side views of other inner member assemblies in accordance with the present invention.

FIGS. 4–7 illustrate various other means for mechanically and fixedly mounting the resilient friction member 38 on the shaft 34 of member assemblies 32. For example, as illustrated in FIG. 4, the bore 50 of friction member 38 is received over the integral shaft portion 37; the shaft 34 comprising a deformable material such as thermoplastic or aluminum. A washer 62 is received over the deformable shaft portion 37 and securely abuts the end of the friction member 38. A tool, utilizing pressure and/or heat, deforms (e.g., crimps) the deformable end portion 42. The end portion 42 is deformed such that it retains the washer 62 against friction member 38 and the friction member 38 against step 46.

Figure 5:
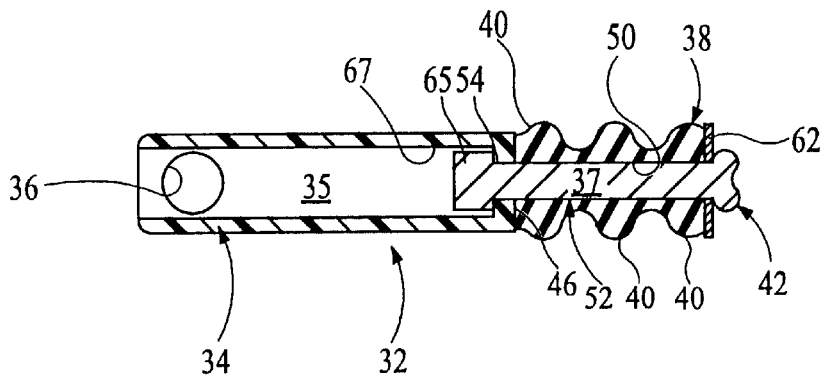

FIG. 5 illustrates a similar assembly 32 as compared to FIG. 4, except the shaft portion 37 comprises a separate member 52 which engages the first portion 35. Preferably, the separate member 52 extending from the first portion 35 is a rivet. The rivet 64 is received through, and engages, hole 54 formed in the first portion 35 and a head 65 thereof abuts a counter bore 67. The bore 50 of friction member 38 is received over the portion 37 and then washer 62 is placed adjacent to its axial end. Upon crimping the deformed end 42 onto washer 62, the friction member 38 is securely mounted to shaft 34 and snuggly presses against step 46.

Figure 6:
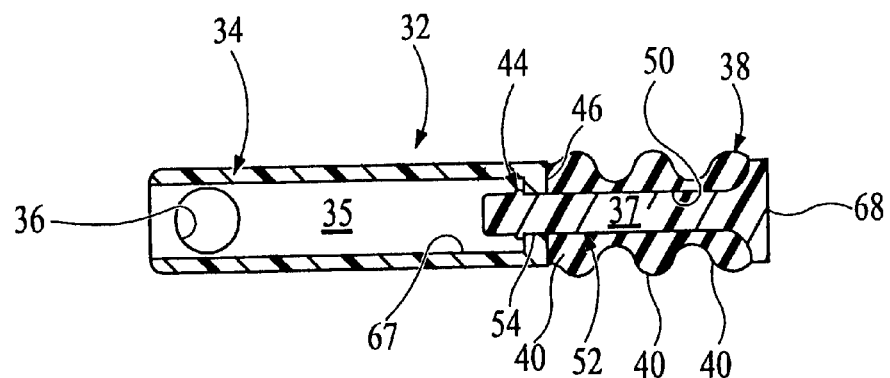

FIG. 6 illustrates another assembly 32 wherein the shaft portion 37 comprises a separate member 52 which engages a hole 54 in the first portion 35. In particular, the separate member 52 includes one or more projections 44 that snap into the first portion 35 to fixedly mount the resilient friction member 38 on the shaft 34. The projection 44 may be a one or more small bumps, a ring, or other interfering projection that is elastically deformed and likewise elastically deform the hole 54 when pressed therethrough. The bore 50 of friction member 38 is first mounted on portion 37. This subassembly is than pressed far enough inward such that the projection(s) 44 reach the counterbore 67. The projections(s) 44, upon passing through hole 54, will expand back out and the hole 54 will reform to its original shape thereby locking the portion 37, and thus the friction member 38, to the portion 35. A head 68 formed on the portion 37 preferably has a diameter which is at least as large as the diameter of the portion 35 at the step 46 thereby adequately retaining the member 38. The dimension from the head 68 to the projection(s) 44 is such that the friction member 38 is securely held in place when installed.

Figure 7:
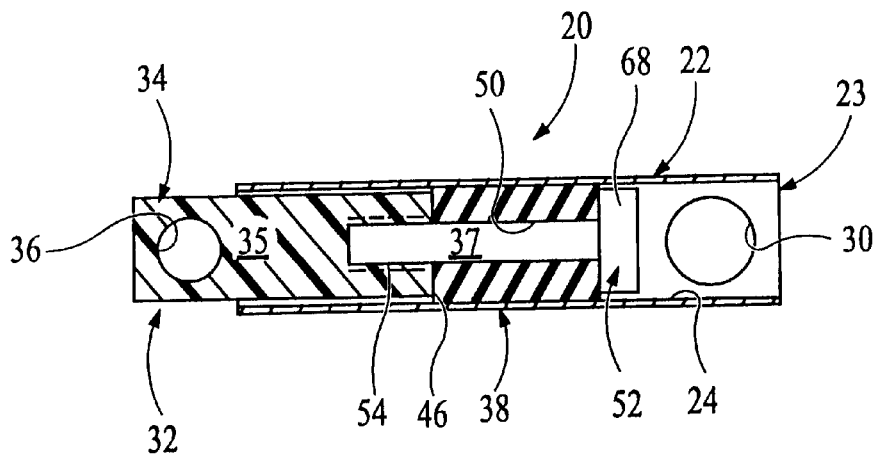
FIG. 7 is a cross sectional side view of another damper in accordance with the present invention.

FIG. 7 illustrates another assembly 32 wherein the shaft portion 37 is a portion of a separate member 52. The separate member 52 engages a threaded hole 54 in the first portion 35. In particular, separate member 52 is a bolt-like fastener that includes head 68 and a threaded portion that engages a like threaded portion in the hole 54. The head 68 formed on the portion 37 preferably has a diameter which is at least as large as the diameter of the portion 35 at the step 46. The resilient friction member 38 shown may be an annular sleeve or include axial fibs as shown in the FIG. 3 embodiment. The bore 50 of friction member 38 is received over fastener 52 and when the fastener 52 is bottomed in hole 54 the resilient friction member (preferably, a substantially incompressible elastomer) will bulge radially to assert a radial force against the wall 24 of outer member 22 and be secured against both the head 68 and step 46. Alternatively, the portions 35, 37 may be devoid of threads and the portion 37 may be ultrasonically welded to the first portion 35 or otherwise secure thereto by an appropriate adhesive. As in all the embodiments herein described, movement of the inner member 32 relative to the outer member, via applying forces at holes 30, 36, produces a damping force that will retard motion of the members the damper 20 is attached to (see FIG. 14).

FIG. 8 illustrates another embodiment of damper 20 and inner member assembly 32 therefor. The damping produced by this embodiment is adjustable by one or more o-rings 56 that are received over the resilient friction member 38. The o-rings 56, even when lubricated, remain stationary within the valleys between the ribs 40 and in contact with the surface 24 of recess 23. The o-rings 56 slide against when member 22 when the member 22, 32 move relative to one another. Adding o-rings increases the effective friction area and friction force obtainable from the damper 20. In this embodiment, the bore 50 of friction member 38 is received over portion 37 extending from integral portion 35 and is preferably fixedly mounted to shaft 34 by suitable cold bond adhesive.

Figure 14:
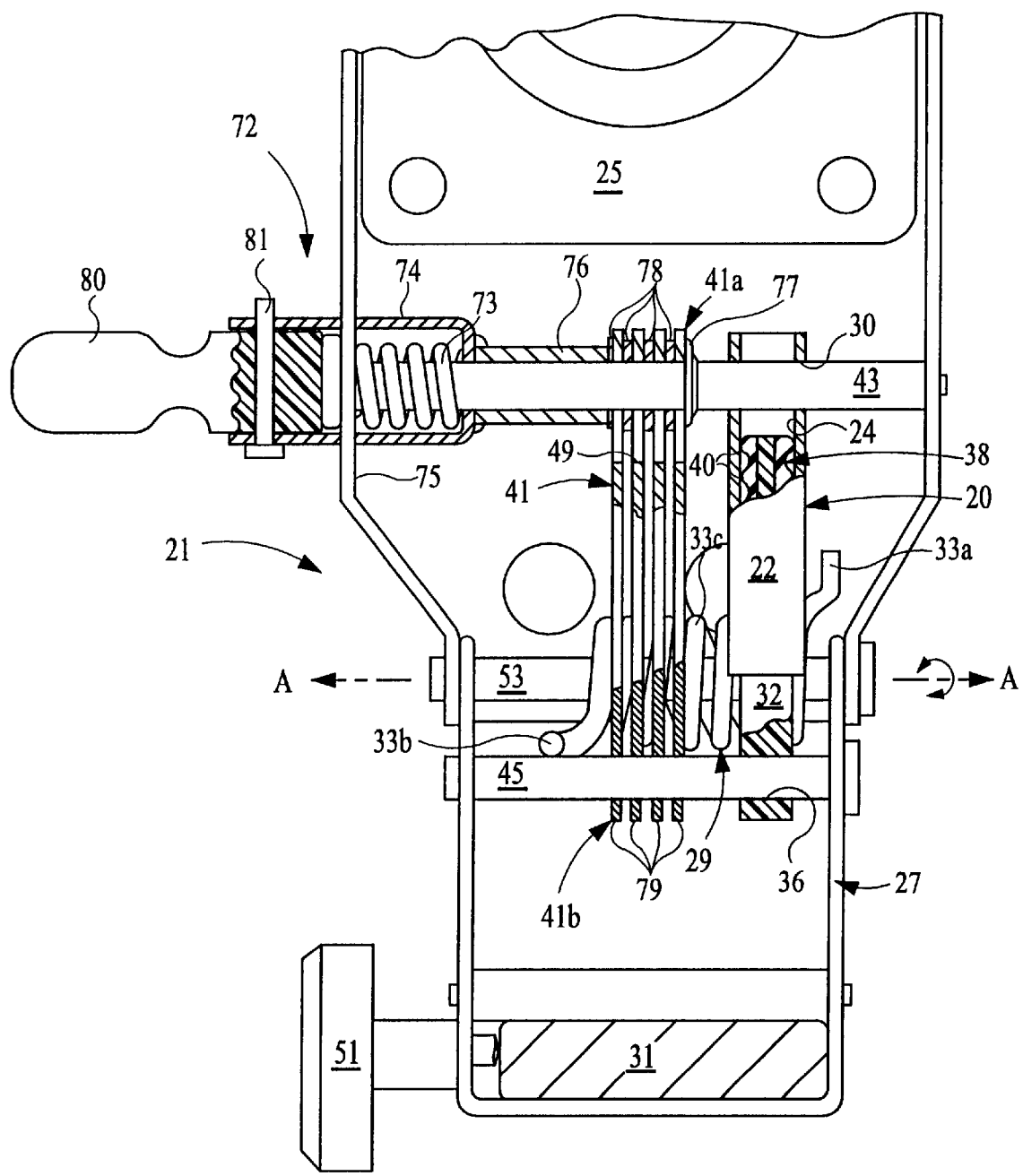
FIG. 14 is a partially sectioned underside view of a tiltable seat assembly in accordance with the present invention.

FIG. 14 illustrates the damper 20 of FIGS. 1 and 2 installed in a tiltable seat assembly 21. The assembly 21 includes a first seat member 25, a second seat member 27 movably mounted (most preferably pivotally mounted about a lateral axis A—A) on the first seat member 25, a spring 29 (e.g., a coil spring) biasing the second seat member 27 relative to the first seat member 25, and a damper 20 pivotally interconnected to the first 25 and second 27 seat members. The first member 25 may be, for example, a base that attaches to the underside of a chair's seat frame (not shown) as is known to persons of ordinary skill in the art. The second seat member 27 may be a U-shaped connector which pivotally attaches at a pivot pin 53 to the first member 25. The seatback upright member 31 is secured by threaded knob 51 to the second member 27 and has the seatback (not shown) mounted thereon.

The spring 29 is preferably a coil spring including a first end 33a which contacts an underside portion of the first member 25, a second end 33b which contacts a portion (the lateral pin 45) of the second member 25 and a central portion 33c which surrounds the pivot pin 53. The spring 29 is preferably installed in a pretensioned condition and biases the second member 27 into a forward position (as shown). Alternate springs types may be employed, such as elastomer tubeform bushings, torsion springs, plate springs, etc.

The damper 20 according to the invention interconnects between a lateral cylindrical rod 43 of the first member 25 and a lateral cylindrical pin 45 of the second member 27; both of which are offset from the pivot pin 53. In particular, rod 43 is pivotally received through attachment hole 30 and pin 45 is pivotally received through attachment hole 36. A stroke limiter pack 41 formed, for example, from a plurality of stamped plate members 49 and interspersed washers 78, also attaches between the first 25 and second 27 members. A slot 49 formed in each of the plates 49 limits the forward and backward strokes of the second 27 relative to the first 25 seat member. The slotted first end 41a of the stroke limiter pack 41 pivotally attaches to a cylindrical lateral rod 43 of the first member 25. A second end 41b of the limiter 41 pivotally attaches to a similar cylindrical lateral pin 45 of the second member 27. The damper 20 damps pivotal motions between the members 25, 27.

The assembly 21 may also include a locking mechanism 72 for locking the second member 27 in any intermediate position (end positions determined by the slot 49) relative to the first member 25. In particular, a coil spring 73 is received over the rod 43 and is precompressed between an inside end of a clevis 74 and a flange 75 of the first member 25. This spring 73 axially loads a cylindrical spacer 76 against the limiter pack 41 which then snugged against a stationary washer 77 welded to rod 43. This axial loading frictionally locks the members 25, 27 from relative pivotal movement.

In more detail, the washers 78 in the limiter pack 41 are interspersed between the plates 79. When the lever 80 (pivotally mounted by pin 81 to clevis 74) is in the position shown, the preload of spring 73 is relieved, eliminating the axial loading of spacer 76, and enabling a change in position. Rotation of the lever 80 downward (out of the paper) again applies an axial load to spacer 76 thereby frictionally locking the washers 78 and plates 79 between the spacer and the stationary washer 77 and resultantly locking the pack 41. This locks the relative position between the members 25, 27, as desired by the user.

In operation (provided the lock mechanism 72 is unengaged), when the user exerts a force on the seatback upright 31 by leaning back in the chair, the second member 27 pivots downward (out of the paper), loads the spring 29, and reciprocates the first member 22 of the damper 20 relative to the second member assembly 32. The pin 43 slides in slot 49 to the extent of the travel allowed.

The damper 20 is made up of a first member 22 and a second member 32 linearly reciprocatable therein. The first member 22 preferably comprises a cylindrical tube and includes a preferably smooth inner engagement surface 24. The damper 20 is mounted between the rods 43, 45 as shown. However, it should be recognized that the orientation may be flipped such that the first member 22 is attached to the second seat member 27 and the second damper member 32 to the first seat member 25. A resilient friction member 38, preferably including a plurality of protrusions 40, is disposed in frictional contact with the engagement surface 24 and the damper 20 provides damping between the first 25 and second 27 seat members to restrain pivotal motion thereof. The damping fosters a controlled movement of the seatback in both pivotal directions. Preferably, a sufficient level of damping force is provided such that the damper 20 prevents abrupt forward stops where the pin 43 contacts the end of slot 49 in the forward position and provides an adequate damped feel for all motions of the seat back. It should be recognized that although the damper of FIGS. 1 and 2 is illustrated in the seat assembly 21, that any of the foregoing damper embodiments illustrated in FIGS. 3–13 may be used as alternatives. Moreover, the damper may be employed in any seat or other assembly to provide damping between relatively moving components.

In summary, it should be apparent from the foregoing that the present invention comprises a novel damper with an outer member and an inner member assembly linearly reciprocatable therein. The assembly includes a resilient friction member received in interference fit relationship with the housing to generate damping forces therebetween. The invention provides a low-cost damper that is simple and robust and particularly useful as a damper in tiltable seat assemblies.

While several embodiments including the preferred embodiment of the present invention have been described in detail, various modifications, alterations, changes, and adaptations to the aforementioned may be made without departing from the scope of the present invention defined in the appended claims. It is intended that all such modifications, alterations and changes be considered part of the present invention.

What is claimed is:

1. A tiltable seat assembly comprising:
   a) a first seat member,
   b) a second sear member movably mounted on the first seat member,
   c) a spring biasing the second seat member relative to the first seat member, and
   d) a damper having a tubular outer member including a first open end and second open end, a recess having an inner surface of substantially constant diameter extending from the first end to the second end; and a first attachment hole radially intersecting the recess at the first end thereof; and an inner member assembly received in the second end including a shaft having a first portion of a constant diameter including a second attachment hole formed radially therethrough and a smaller dimension portion extending from the first portion, and a one-piece resilient friction member including a plurality of protrusions fixedly mounted to the smaller dimension portion, the one-piece resilient friction member disposed in the recess in frictional contact with the inner surface, said damper interconnecting between die first seat member and the second seat member.

2. A tiltable seat assembly comprising:
   a) a first seat member,
   b) a second sear member movably mounted on the first seat member,
   c) a spring biasing the second seer member relative to the first seat member, and
   d) a damper having a tabular outer member including a first open end and second open end, a recess having an inner surface of substantially constant diameter extending from the first end to the second end; and a first attachment hole radially intersecting the recess at the first end thereof: and an inner member assembly received in the second end including a shaft having a first portion of a constant diameter including a second attachment hole formed radially therethrough and a smaller dimension portion extending from the first portion, and a one-piece resilient friction member including a plurality of protrusions fixedly mounted to the smaller dimension portion, the one-piece resilient friction member disposed in the recess in frictional contact with the inner surface, wherein the damper provides damping between the first and second seat members.

3. A tiltable seat assembly comprising:
   a) a first seat member,
   b) a second seat member pivotally mounted on the first seat member,
   c) a spring biasing the second seat member relative to the first seat member, and
   d) a damper having a tubular outer member including a first open end and second open end, a recess having an inner surface of substantially constant diameter extending from the first end to the second end; and a first attachment hole radially intersecting the recess at the first end thereof; and an inner member assembly received in the second end including a shaft having a first portion of a constant diameter including a second attachment hole formed radially therethrough and a smaller dimension portion extending from the first portion, and a one-piece resilient friction member including a plurality of protrusions fixedly mounted to the smaller dimension portion, the one-piece resilient friction member disposed in the recess in frictional contact with the inner surface, wherein the damper provides damping between the first seal member and the second seat member.

4. A tiltable seat assembly, comprising:
   a) a first seat member,
   b) a second seat member pivotally mounted to the first seat member,
   c) a coil spring biasing the second seat member to a forward position, and
   d) a damper having a tubular outer member including a first open end and second open end, a recess having an inner surface of substantially constant diameter extending from the first end to the second end; and a first attachment hole radially intersecting the recess at the first end thereof; and an inner member assembly received in the second end including a shaft having a first portion of a constant diameter including a second attachment hole formed radially therethrough and a smaller dimension portion extending from the first portion, and a one-piece resilient friction member including a plurality of protrusions fixedly mounted to the smaller dimension portion, the one-piece resilient friction member disposed in the recess in frictional contact with the inner surface,
   wherein the damper provides frictional damping between the first seat and said second seat members.

* * * * *